(12) United States Patent
Elsey et al.

(10) Patent No.: US 11,797,056 B2
(45) Date of Patent: Oct. 24, 2023

(54) STYLUS HOLDERS

(71) Applicant: Hewlett-Packard Development Company, L.P., Spring, TX (US)

(72) Inventors: Andrew Shane Elsey, Spring, TX (US); Derek Kyle Joseph Kanas, Spring, TX (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 143 days.

(21) Appl. No.: 17/599,817

(22) PCT Filed: Jul. 24, 2019

(86) PCT No.: PCT/US2019/043310
§ 371 (c)(1),
(2) Date: Sep. 29, 2021

(87) PCT Pub. No.: WO2021/015767
PCT Pub. Date: Jan. 28, 2021

(65) Prior Publication Data
US 2022/0179458 A1    Jun. 9, 2022

(51) Int. Cl.
*G06F 1/16*         (2006.01)
*G06F 3/0354*       (2013.01)

(52) U.S. Cl.
CPC ........ *G06F 1/1656* (2013.01); *G06F 3/03545* (2013.01); *G06F 2200/1632* (2013.01)

(58) Field of Classification Search
CPC ................ G06F 1/1633; G06F 1/1643; G06F 2200/1632; G06F 3/03545
See application file for complete search history.

(56) References Cited

U.S. PATENT DOCUMENTS

| 4,905,015 | A | | 2/1990 | Sieber et al. | |
|---|---|---|---|---|---|
| 5,180,891 | A | * | 1/1993 | Trumbo | B43M 99/008 178/19.01 |
| 6,114,958 | A | * | 9/2000 | Murphy | G06F 1/1616 340/568.1 |
| 7,623,121 | B2 | * | 11/2009 | Dodge | G06F 3/0393 345/179 |
| 9,748,999 | B2 | | 8/2017 | Nyholm et al. | |
| 9,971,379 | B2 | | 5/2018 | Griffin, II et al. | |
| 2013/0049345 | A1 | * | 2/2013 | Imbernino | B42D 3/12 281/31 |
| 2015/0116286 | A1 | | 4/2015 | Stewart et al. | |
| 2017/0063419 | A1 | * | 3/2017 | Griffin, II | H04B 1/3888 |
| 2017/0156465 | A1 | | 6/2017 | Zaloom | |

(Continued)

FOREIGN PATENT DOCUMENTS

| CN | 202584039 U | 12/2012 |
|---|---|---|
| CN | 105500963 A | 4/2016 |
| JP | 3087996 U | 8/2002 |

*Primary Examiner* — Anthony Q Edwards
(74) *Attorney, Agent, or Firm* — Knobbe, Martens, Olson & Bear, LLP (57) ABSTRACT

Example stylus holders for an electronic device are disclosed. In an example, the stylus holder includes a sleeve that is to receive a stylus therethrough. In addition, the stylus holder includes an actuation assembly coupled to the sleeve. The actuation assembly includes a cam that is magnetically actuated by the stylus to extend the sleeve through an aperture in an external surface of the electronic device.

15 Claims, 6 Drawing Sheets

(56) References Cited

U.S. PATENT DOCUMENTS

| | | | |
|---|---|---|---|
| 2017/0248999 A1* | 8/2017 | Ng | H01R 31/06 |
| 2017/0346523 A1 | 11/2017 | Nyholm et al. | |
| 2018/0059817 A1* | 3/2018 | Pirie | G06F 3/03545 |
| 2018/0217687 A1* | 8/2018 | Yoo | G06F 3/03545 |
| 2020/0209992 A1* | 7/2020 | Kwak | G06F 3/03545 |
| 2022/0334660 A1* | 10/2022 | Horie | G06F 3/04162 |
| 2022/0350427 A1* | 11/2022 | Kamiyama | G06F 3/044 |
| 2023/0037203 A1* | 2/2023 | Yu | G06F 1/1683 |

\* cited by examiner

STYLUS HOLDERS

BACKGROUND

Styluses are pen-shaped devices that may be used to provide inputs to an electronic device. Styluses are particularly useful for providing inputs to an electronic device that has a touch sensitive display or surface. During operations, a user may grasp the stylus (e.g., like a pen or other writing instrument) and maneuver the stylus to draw or write words, images, etc., on the touch sensitive display or surface such that they may be displayed in an electronic format by the electronic device (e.g., on a display).

BRIEF DESCRIPTION OF THE DRAWINGS

Various examples will be described below referring to the following figures.

DETAILED DESCRIPTION

In the figures, certain features and components disclosed herein may be shown exaggerated in scale or in somewhat schematic form, and some details of certain elements may not be shown in the interest of clarity and conciseness. In some of the figures, in order to improve clarity and conciseness, a component or an aspect of a component may be omitted.

In the following discussion and in the claims, the terms "including" and "comprising" are used in an open-ended fashion, and thus should be interpreted to mean "including, but not limited to . . . ." Also, the term "couple" or "couples" is intended to be broad enough to encompass both indirect and direct connections. Thus, if a first device couples to a second device, that connection may be through a direct connection or through an indirect connection via other devices, components, and connections. In addition, as used herein, the terms "axial" and "axially" generally refer to positions along or parallel to a central or longitudinal axis (e.g., central axis of a body or a port).

As used herein, including in the claims, the word "or" is used in an inclusive manner. For example, "A or B" means any of the following: "A" alone, "B" alone, or both "A" and "B." As used herein, the term "display" refers to an electronic display (e.g., a liquid crystal display (LCD), an organic light-emitting diode (OLED) display, a plasma display, etc.) that is to display images generated by an associated electronic device. The term "flexible display" refers to an electronic display that may be deformed (e.g., rolled, folded, etc.) within a given parameter or specification (e.g., a minimum radius of curvature) without losing electrical function or connectivity. As used herein, the term "electronic device," refers to a device that is to carry out machine readable instructions, and may include internal components, such as, processors, power sources, memory devices, etc. For example, an electronic device may include, among other things, a personal computer, a smart phone, a tablet computer, a laptop computer, a personal data assistant, etc.

As previously described, styluses are devices that may be used to form words or images on a touch sensitive display or surface of an electronic device. Because a stylus may be used infrequently and is relatively small (that is compared to the size of the electronic device that the stylus may be utilized with), these devices may be separated from the electronic device and ultimately lost. Accordingly, examples disclosed herein include stylus holders for an electronic device that are to provide a storage location along the electronic device for receiving and holding a stylus when not in use. In addition, the stylus holders disclosed herein may be extendable from an external surface of the electronic device such that the stylus holders may be partially or wholly retracted into the external surface of the electronic device when a stylus is not stored therein. As a result, the stylus holders may not change an overall aesthetic appearance of the electronic device when a stylus is not inserted therein. Further, partially or wholly retracting the stylus holder from the external surface of the electronic device may prevent additional wear to the stylus holder, as it will not be exposed to adverse environments when a stylus is not stored therein.

Figure 1:
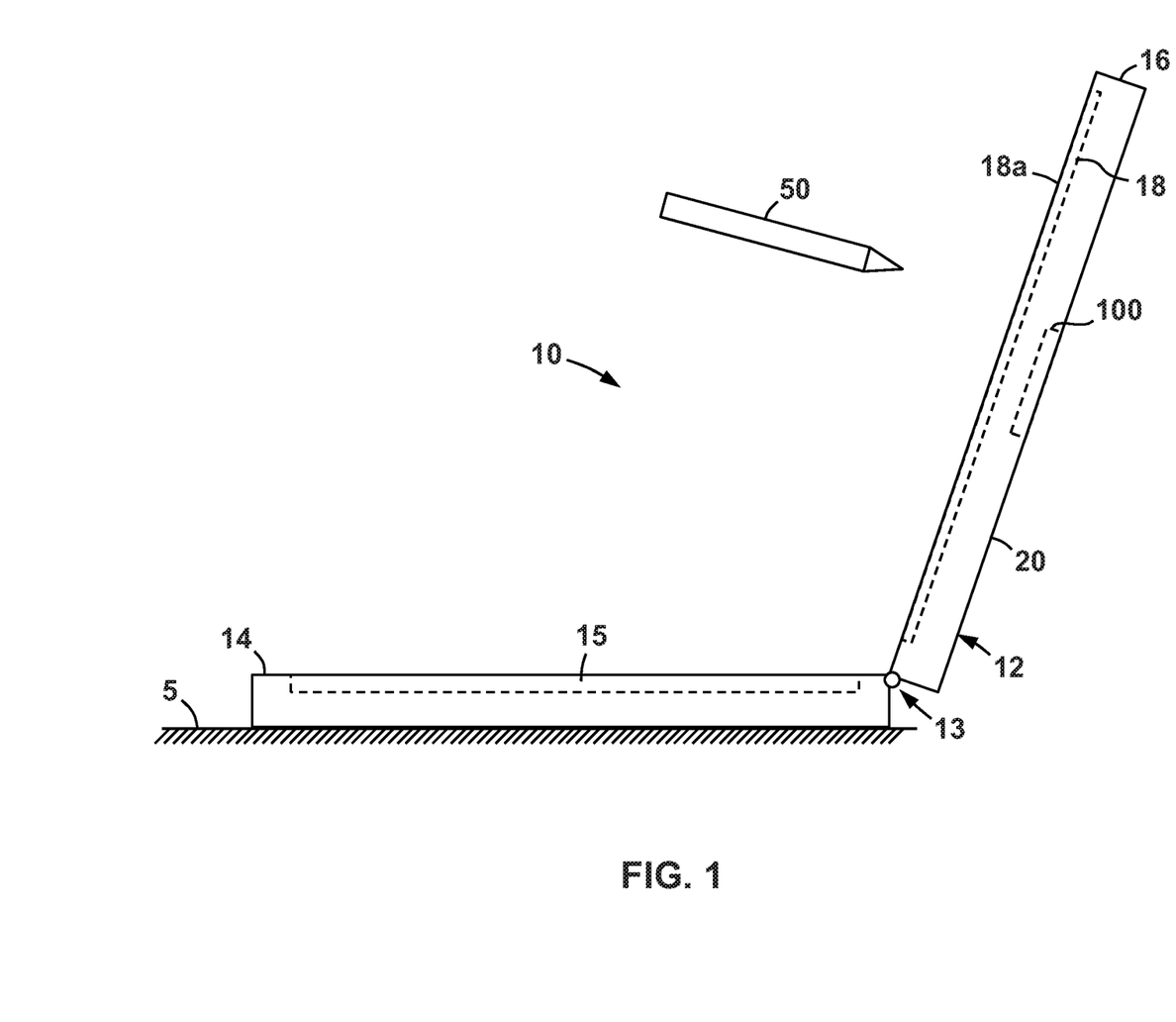
FIG. 1 is side view of an electronic device including a stylus holder according to some examples.

Referring now to FIG. 1, an electronic device 10 according to some examples is shown. Electronic device 10 generally includes a housing 12 that is to hold and support the various components and features of electronic device 10. In this example, electronic device 10 is a laptop computer such that housing 12 includes a first housing member 14 rotatably coupled to a second housing member 16 at a hinge 13. The first housing member 14 includes a user input device 15, such as, for example, a keyboard, and/or a trackpad, etc. The second housing member 16 includes an electronic display 18 (or more simply "display 18") that is to project images out of a front side or surface 18a for viewing by a user (not shown) of the electronic device 10. In some examples, display 18 may be a flexible display; however, display 18 may not be a flexible display in other examples.

In addition, in some examples, display 18 may be touch-sensitive, such that display 18 may detect inputs on electronic device 10 from physical contact with a user's finger or a stylus 50 during operations. Display 18 may utilize any suitable touch sensitive technology, such as, for instance, capacitive touch sensitivity, resistive touch sensitivity, surface acoustic wave touch sensitivity, etc. Accordingly, during operations, a user may engage display 18 with a finger, stylus 50, or some other device to affect changes on applications executed by electronic device 10.

Second housing member 16 includes an external surface 20 that is disposed on a side of second housing member 16 that is opposite the display 18. A stylus holder 100 is coupled to the external surface 20 that may provide a storage location for a stylus 50 when not in use. In other examples, stylus holder 100 may be disposed along another surface of electronic device 10, such as, for instance, another surface of second housing member 16 (that is, other than external surface 20), an external surface of first housing member 14, etc. In some examples, stylus holder 100 may be disposed along a perimeter or side surface of electronic device 10 (e.g., of one of the first housing member 14 or the second housing member 16). Further details of the stylus holder 100 will be described in more detail below.

Figure 2:
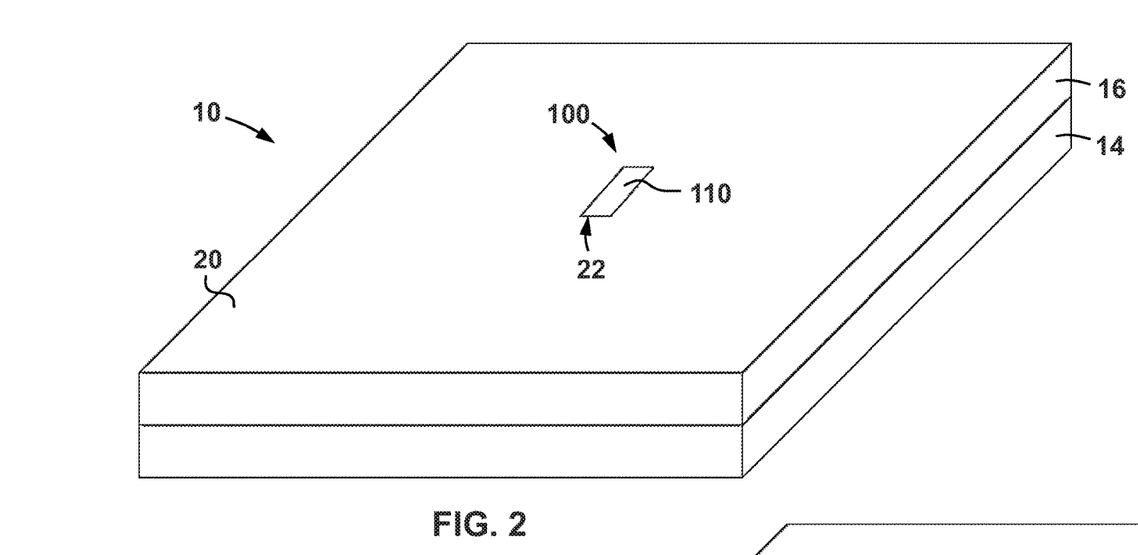
FIG. 2 is a perspective view of the electronic device of FIG. 1 with the sleeve of the stylus holder shown in a retracted position according to some examples.

Referring now to FIGS. 1 and 2, during operations, a user of electronic device 10 may place the first housing member 14 on a support surface 5 (e.g., desk, table, countertop, floor, etc.). In addition, electronic device 10 may be transitioned between an open position shown in FIG. 1 and a closed position shown in FIG. 2. Specifically, in the open position, the second housing member 16 is rotated about the hinge 13, away from the first housing member 14 so as to expose both the user input device 15 and display 18. In the closed position, the second housing member 16 is rotated about the hinge 13, toward the first housing member 14 until the housing members 16, 14 are engaged with one another and the input device 15 and display 18 are occluded. Thus, external surface 20 may form an upper surface of electronic device 10 when housing 12 is placed in the closed position (e.g., FIG. 2).

Figure 3:
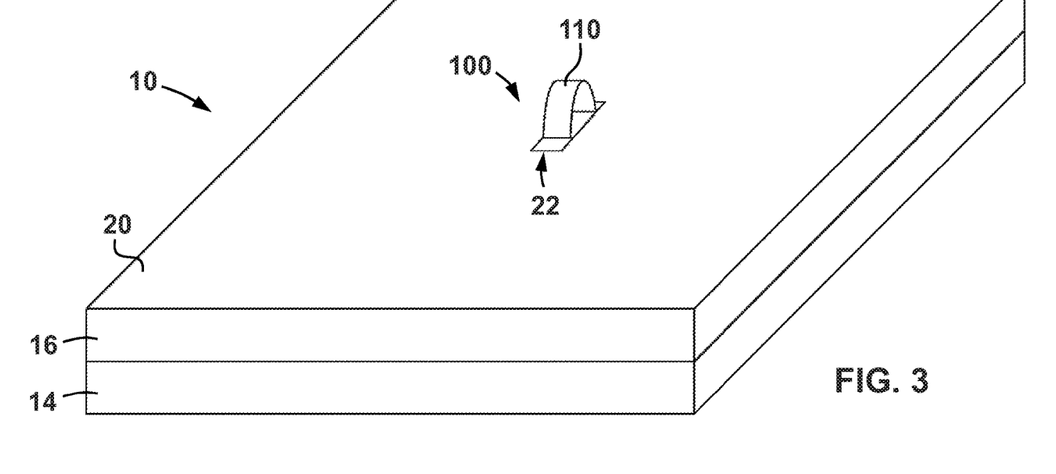
FIG. 3 is a perspective view of the electronic device of FIG. 1 with the sleeve of the stylus holder in an extended position according to some examples.
Figure 4:
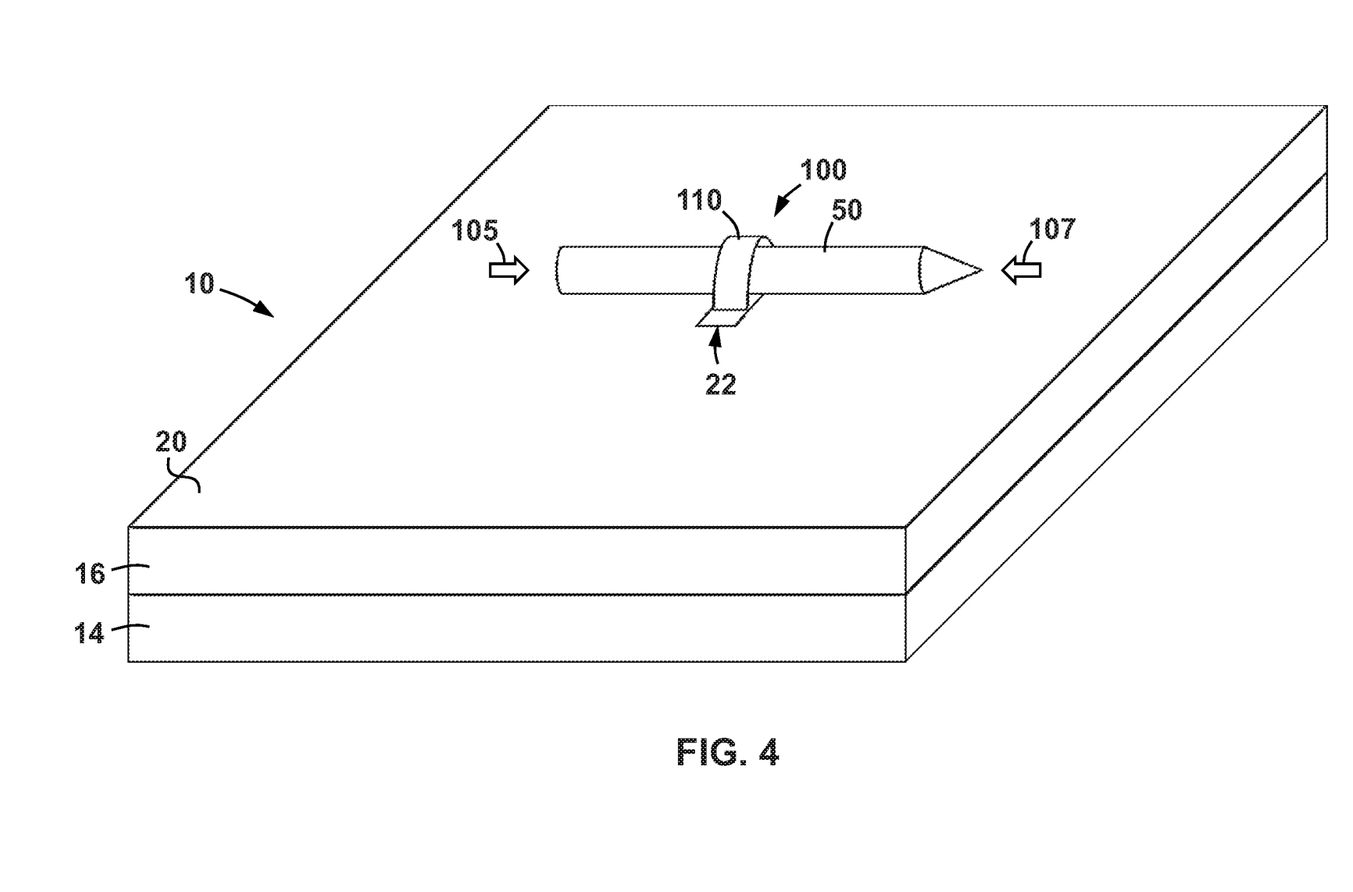
FIG. 4 is a perspective view of the electronic device of FIG. 1 with a stylus inserted within the sleeve of the stylus holder according to some examples.

Referring now to FIGS. 2 and 3, stylus holder 100 includes a sleeve 110 that is aligned with an aperture 22 extending through external surface 20 of second housing member 16. During operations, sleeve 110 may be transitioned between a withdrawn or retracted position shown in FIG. 2 wherein sleeve 110 is retracted (wholly, partially, etc.) within aperture 22, and a deployed or extended position shown in FIG. 3 wherein sleeve 110 is extended from aperture 22 and away from external surface 20. Sleeve 110 may comprise an elongate band or strip that may be laid flat (or partially flat), such as when sleeve 110 is in the retracted position (FIG. 2), or deformed and extended upward to form a curved arch, such as when sleeve 110 is in the extended position (FIG. 3). In some examples, sleeve 110 may comprise silicone, but may comprise any other suitable material in other examples (e.g., metal, polymer, carbon fiber, etc.). Referring briefly to FIG. 4, when sleeve 110 is in the extended position (e.g., FIG. 3) (and thus deformed to arch upward as previously described), stylus 50 may be inserted therethrough such that stylus 50 may be stored or kept along external surface 20 of second housing member 16 when not in use. As will be described in more detail below, stylus holder 100 includes an actuation assembly (not shown in FIGS. 2-4, but see actuation assembly 120 shown in FIGS. 5-6 and discussed below) that is to actuate the sleeve 110 between the withdrawn position (FIG. 2) and the extended position (FIG. 3) during operations.

Figure 5:
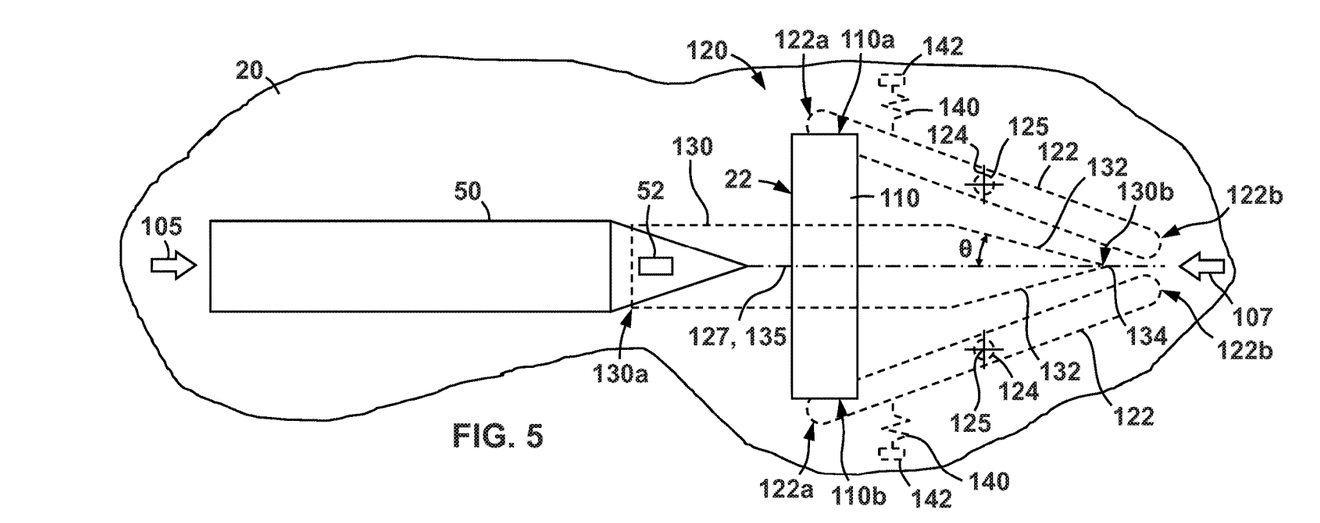
FIGS. 5 and 6 are top views of the stylus holder of the electronic device of FIG. 1, with the sleeve of the actuation holder in the retracted and extended positions, respectively, according to some examples.

Referring now to FIG. 5, in this example, actuation assembly 120 includes a plurality of arms 122 that are coupled to sleeve 110 and a cam 130 that is movable relative to arms 122 and sleeve 110 during operations. In this example, the arms 122 and cam 130 may be disposed underneath external surface 20 (and thus within second housing member 16 shown in FIGS. 1-4). As a result, arms 122 and cam 130 are depicted in FIGS. 5 and 6 with hidden lines.

Arms 122 are elongate members that include a first end 122a, and a second end 122b opposite first end 122a. In addition, arms 122 are each rotatably mounted under external surface 20 (i.e., within second housing member 16 shown in FIGS. 2-4) such that arms 122 may each rotate or pivot about a corresponding axis of rotation 125. Axes 125 are parallel and radially offset from one another. In addition, in this example, axes 125 extend generally normal or perpendicular to external surface 20; however, such alignment is not necessarily present in other examples. In this example, arms 122 are each rotatably mounted on a pair of corresponding pin connectors 124.

First ends 122a of arms 122 are coupled to sleeve 110. In particular, in some examples (e.g., such as the example of FIG. 5), first end 122a of one of the arms 122 is coupled to a first end 110a of sleeve 110, and first end 122a of the other of the arms 122 is coupled to a second end 110b of sleeve 110 that is opposite first end 110a. In other examples, first ends 122a of arms 122 may be coupled to sleeve 110 at points that are spaced from ends 110a, 110b. However, in some of these examples, first ends 122a of arms 122 may be coupled to sleeve 110 such that first end 122a of one of the arms 122 is coupled to sleeve 110 at a point or location that is more proximate first end 110a than second end 110b, and the first end 122a of the other of the arms 122 is coupled to sleeve 110 at a point or location that is more proximate second end 110b than first end 110a.

Figure 6:
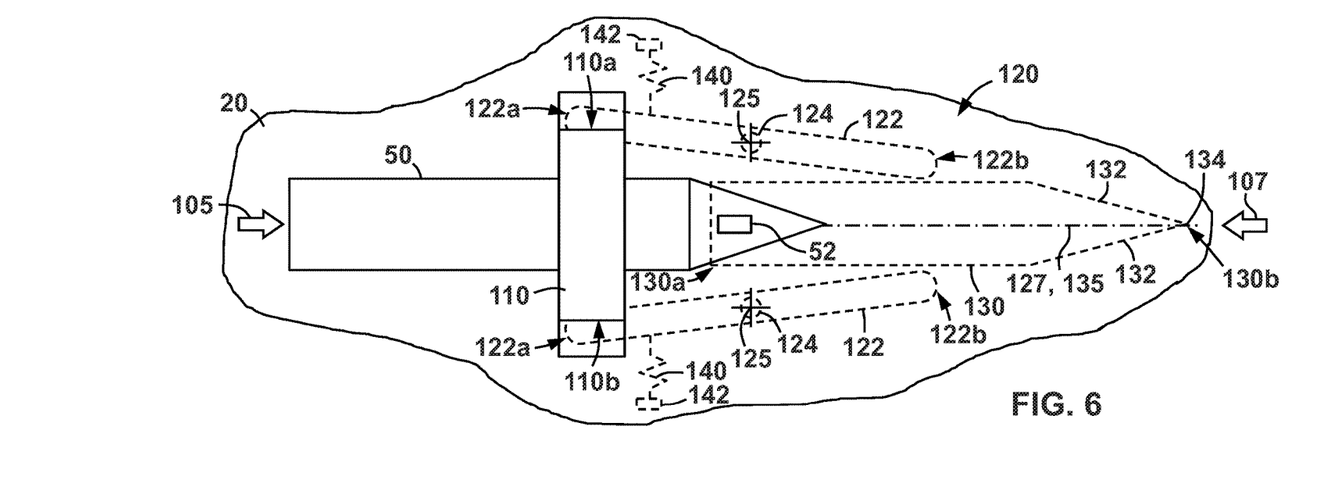

When arms 122 rotate about axes 125 to move first ends 122a toward one another, the ends 110a, 110b of sleeve 110 are also translated toward one another to thereby cause sleeve 110 to deform and arch outward from aperture 22 to the extended position of FIGS. 3 and 6. Conversely, when arms 122 rotate about axes 125 to move first ends 122a of arms 122, arms 122 are rotated away from one another, and the ends 110a, 110b of sleeve 110 are also translated away from one another to thereby cause sleeve 110 to flatten and withdraw within aperture 22 to the retracted position of FIGS. 2 and 5. Thus, the rotation of arms 122 may transition the sleeve 110 between the retracted and extended positions shown in FIGS. 2 and 3 and previously described above.

Arms 122 are rotationally biased about pin connectors 124 such that first ends 122a are rotationally biased away from one another. In this example, arms 122 are rotationally biased by corresponding biasing members 140 that are secured to suitable structure(s) 142 within second housing member 16. Structures 142 may comprise any suitable block, column, or other suitable structure for attaching or securing one end of biasing members 140 thereto. Without being limited to this or any other theory, by rotationally biasing first ends 122a of arms 122 apart from one another about pinned connectors 124 (and thus axes 125), sleeve 110 may be biased to the retracted position shown in FIG. 2 and previously described above.

In some examples, various other methods or devices may be used to rotationally bias arms 122 about axes 125 as described above (that is, other than biasing members 140). For instance, in other examples, arms 122 may be biased with torsion springs coupled to pinned connectors 124, by a biasing member coupled between arms 122, etc. In still other examples, a resilience or stiffness of sleeve 110 may allow the sleeve 110 to serve as a biasing member for rotationally biasing first ends 122a of arms 122 apart from one another in the manner described above. In some of these examples, the sleeve 110 may comprise a metal or other sufficiently stiff and resilient material to provide the above described biasing force.

Referring specifically now to FIGS. 5 and 6, cam 130 is movable disposed between the arms 122 so as to cause arms 122 to rotate about axes 125 during operations. Cam 130 may be an elongate member including a central axis 135, a first end 130a, and a second end 130b opposite first end 130a. Second end 130b may include a point 134 that is defined by a pair of angled edges 132 that converge toward one another. The angled edges 132 may extend at an angle θ relative to the central axis 135 that is greater than 0° and less than 90°. As will be described in more detail below, during operations, cam 130 may be translated along a central axis 127 of actuation assembly 120 (which may be generally aligned with axis 135 of cam 130) so as to deflect second ends 122b of arms 122 apart from one another, thereby causing rotation of arms 122 about axes 125 and actuation of sleeve 110 to the extended position (e.g., FIG. 3). While not specifically shown in FIGS. 5 and 6, cam 130 may be constrained to translate along axis 135 during operations. For instance, in some examples cam 130 may be disposed between a pair of rails or walls that are parallel to and radially offset from axis 135. In other examples cam 130 may be mounted to a track that extends in a direction that is parallel to axis 135. Still other mechanisms for constraining the movement of cam 130 along axis 135 may be used in other examples.

In some examples, cam 130 may comprise a "magnetically sensitive material." As used here, a "magnetically sensitive material" comprises any material (or combination of materials) that is movable (e.g., attracted or repulsed) by an applied magnetic field (e.g., such as magnets, ferrous materials, etc.). For instance, a "magnetically sensitive material" includes a metallic material that may be moved (e.g., attracted or repulsed) by a magnetic field generated by a magnet (e.g., electromagnetic, permanent magnet, etc.); however, the term is not limited to metallic materials and is applied to cover all materials that may be moved (e.g., attracted or repulsed) by a magnetic field. Thus, during operations, a magnetic field may be applied to cam 130 to thereby cause cam 130 to move relative to arms 122 under external surface 20.

During operations, movement of the stylus 50 along external surface 20 may magnetically actuate actuation assembly 120 so as to place the sleeve 110 in the extended and arched position of FIG. 3. As a result, sleeve 110 may be extended so as to receive stylus 50 therethrough. Conversely, when stylus 50 is withdrawn from sleeve 110, actuation assembly 120 may automatically actuate sleeve 110 to the retracted or withdrawn position of FIG. 2. These operations for the automatic extension and retraction of sleeve 110 will each now be described in more detail below.

Referring now to FIG. 5, stylus 50 may be slid or moved along external surface 20 of second housing member 16 (see e.g., FIGS. 2 and 3) toward aperture 22 in a first axial direction 105, with respect to axis 127 of actuation assembly 120. In this example, stylus 50 includes a magnet 52 disposed therein, which may comprise any suitable permanent magnet, an electromagnet, etc. The magnet 52 may attract the magnetically sensitive cam 130 so that once stylus 50 (particularly magnet 52) is brought into close proximity to cam 130, additional movement of stylus 50 in axial direction 105 along axis 127 also causes a corresponding movement of cam 130 in axial direction 105 along axis 127. As shown in the sequence from FIG. 5 to FIG. 6, eventually, the point 134 of cam 130 is driven between second ends 122b of arms 122 such that angled edges 132 slidingly engage with second ends 122b to thereby rotate arms 122 about the corresponding axes 125 at pinned connectors 124. As a result, the first ends 122a of arms 122 are rotated about axes 125 toward one another such that sleeve 110 is transitioned to the extended, arched position of FIG. 3 as previously described above. The advance of stylus 50 in the first axial direction 105 may continue so as to advance stylus 50 into and through the arched, extended sleeve 110 and thereby secure stylus 50 to external surface 20 (see e.g., FIGS. 4 and 6).

Referring now to FIG. 6, when a user wishes to remove stylus 50 from sleeve 110 (e.g., such that the user may utilize stylus 50 to provide inputs on display 18), the user may withdraw stylus 50 from sleeve 110 in a second axial direction 107 with respect to axis 127 that is opposite the first axial direction 105. Because of the magnetic attraction between the magnet 52 within stylus 50 and the magnetically sensitive cam 130, the axial withdrawal of stylus 50 from sleeve 110 along second axial direction 107 may also axially translate cam 130 along second axial direction 107, away from second ends 122b of arms 122. As a result, the arms 122 may then be allowed to rotate, under the rotational bias provided by biasing members 140 to the original position of FIG. 5 so that the sleeve 110 is flattened and withdrawn within aperture 22 as previously described above (see e.g., FIG. 2).

Accordingly, the sleeve 110 may be automatically actuated between the withdrawn and extended positions during operations by the magnetic attraction between magnet 52 within stylus 50 and the magnetically sensitive cam 130. As a result, the sleeve 110 may be withdrawn and hidden when stylus 50 is being used by a user (e.g., to provide inputs to display 18) and may automatically actuate and extend to receive stylus 50 as a user moves the stylus 50 along external surface 20 toward stylus holder 100 (e.g., in the axial direction 105) for storage thereof. In some examples, appropriate markings or symbols may be placed on external surface 20 to indicate the proper directions and alignment of stylus 50 (e.g., axial directions 105, 107) to actuate sleeve 110 between the withdrawn and extended positions as described above. In other examples, a physical profile or shape of external surface 20 may be arranged to facilitate and/or guide the sliding of stylus 50 along axis 135 to actuate sleeve 110 during operations. For instance, in some examples a groove or slot may be formed along external surface 20 that is aligned (and possibly axially offset) or parallel with axis 135. During operations, the stylus 50 is to slide along the groove so as to facilitate the magnetic actuation of cam 130 in the manner described above.

Referring now to FIGS. 5 and 6, some examples of the actuation assembly 120 specifically described herein have included a pair of arms 122 that are deflected by a cam 130 to actuate the sleeve 110 between the extended, arched, and retracted, flattened positions of FIGS. 3 and 2, respectively. However, in other examples, actuation assembly 120 may include one arm 122. In some of these examples, one end of sleeve 110 (e.g., end 110a) may be coupled to a first end 122a of the one arm 122, while the other end of sleeve 110 (e.g., end 110b) may be fixed to external surface 20 or some other structure. With one end of the sleeve 110 fixed, the rotation of the first end 122a of the one arm 122 may cause the end 110a of sleeve 110 to move toward and away from the other end 110b in substantially the same manner as described above. Thus, during operations, cam 130 may be translated to engage with arm 122 in the same manner previously described above so as to selectively extend (e.g., arch) and retract (e.g., flatten) sleeve 110 from aperture 22 as previously described. In some of these examples, the cam 130 may include one angled edge 132 rather than the pair of angled edges 132 shown in FIGS. 5 and 6.

Referring still to FIGS. 5 and 6, while some examples described above have included a magnetically sensitive cam 130 that is attracted by the magnet 52 within stylus 50, in other examples, the cam 130 may include or comprise a magnet and the stylus 50 may comprise a magnetically sensitive component or material. During operations, the movement of stylus 50 along axial directions 105, 107 may cause a magnetically attractive force (e.g., magnetically attractive force) between the magnetically sensitive stylus 50 and the magnet within or comprising cam 130 so as to selectively actuate cam 130, arms 122 (or a single arm 122 as described above), and sleeve 110 in the same manner as described above.

Referring still to FIGS. 5 and 6, in still other examples cam 130 may be actuated via a user engaged member either in addition to or in lieu of the magnetic actuation described above. For instance, in some examples, a knob may extend from external surface 20 that is engaged by a user to physically force cam 130 to translate along axis 135 to thereby actuate sleeve 110 in the manner described above. Thus, in some of these examples the knob may be physically coupled to cam 130 and may slide along external surface 20 in a direction that is parallel to axis 135.

Figure 7:
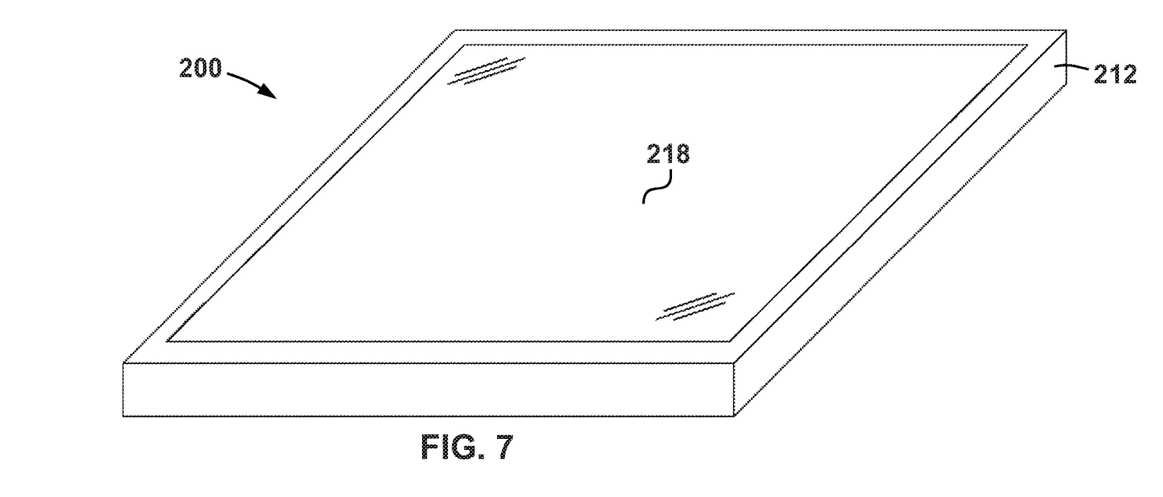
FIGS. 7 and 8 are perspective views of an electronic device including a stylus holder according to some examples.
Figure 8:
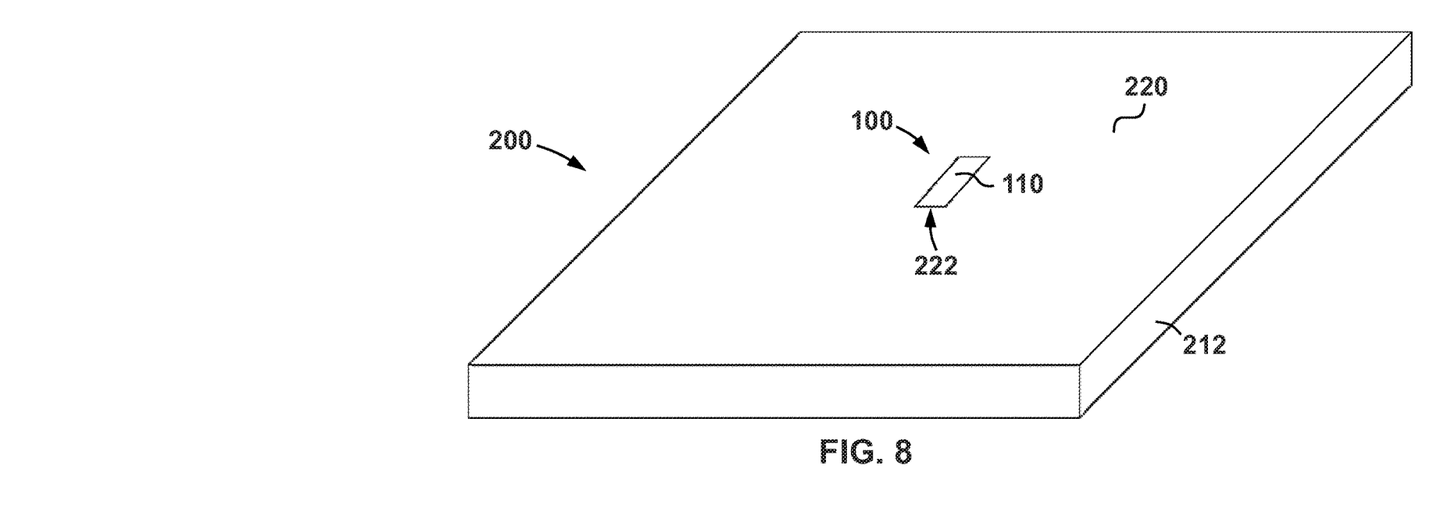

Referring now to FIGS. 7 and 8, another electronic device 200 according to some examples is shown. In this example, electronic device 200 is a tablet-style computer. Thus, electronic device 200 includes a housing 212 and a display 218. The description above with respect to display 18 of electronic device 10 (see e.g., FIG. 1) may be applied to describe display 218. Thus, this description is not repeated herein in the interests of brevity. In addition, housing 212 includes an external surface 220 that is on a side of housing 212 that is opposite display 218. As best shown in FIG. 8, electronic device 200 also includes a stylus holder 100 disposed along external surface 220. The stylus holder 100 may include a sleeve 110 that is extendable from an aperture 222 in external surface 220 in substantially the same manner as described above for electronic device 10. Thus, the description of the stylus holder 100 of electronic device 10 may be applied to fully describe the structure and function of stylus holder 100 included within electronic device 200. As a result, this description is not repeated for electronic device 200 in the interest of brevity. Therefore, during operations the sleeve 110 of stylus holder 100 may be magnetically actuated as stylus (e.g., stylus 50) is moved along external surface 220 in the manner previously described above.

Figure 9:
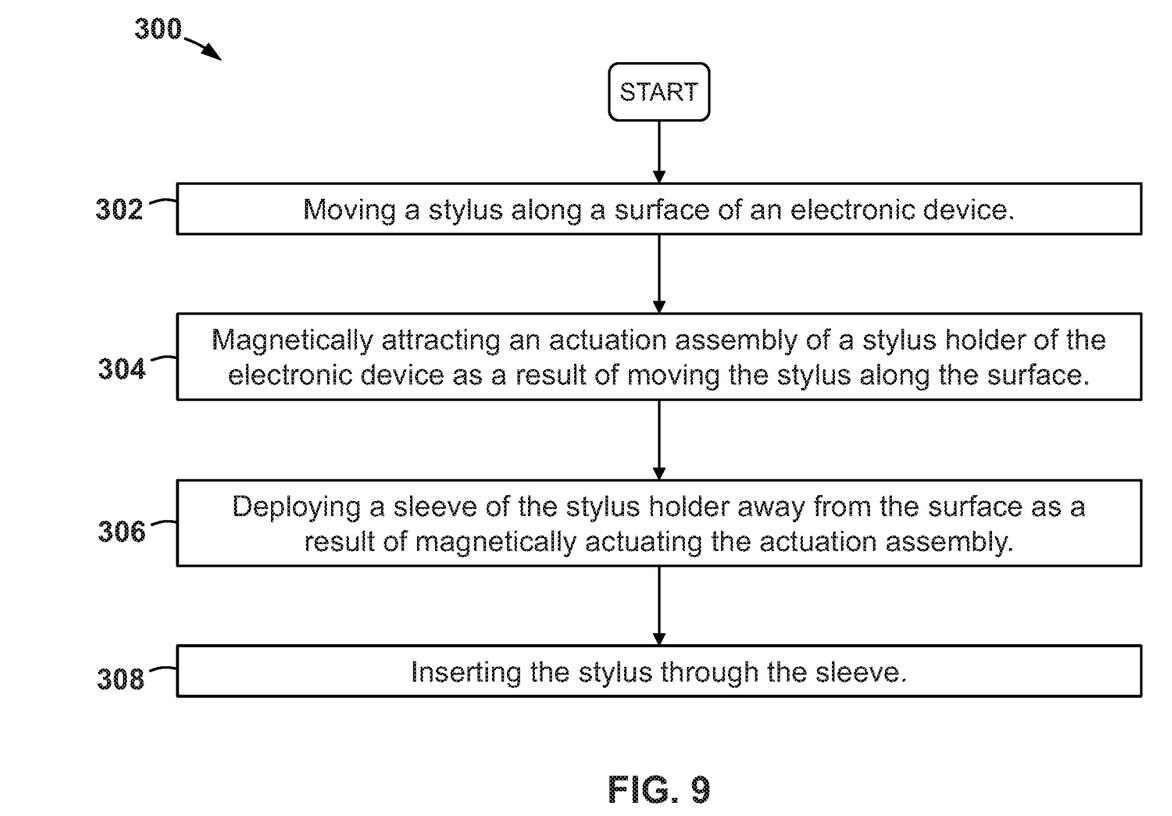
FIG. 9 is a diagram of a method according to some examples.

Referring now to FIG. 9, a method 300 for storing a stylus on an electronic device (e.g., electronic device 10, 200, etc.) is shown. In describing the features of method 300 continuing reference is made to FIG. 9; however, at times specific reference is also made to the stylus holders described above (e.g., stylus holder 100). However, method 300 may be practiced with other devices that are different from the above described stylus holders. Thus, any reference to the previously described stylus holders is merely intended to further describe some examples of method 300.

Initially, method 300 includes moving a stylus along a surface of an electronic device at 302. For instance, in the example of FIGS. 5 and 6, a stylus 50 is moved along an external surface 20 of a second housing member 16 of electronic device 10 (see also FIG. 4). Next, method 300 includes magnetically attracting an actuation assembly of a stylus holder of the electronic device as a result of moving the stylus along the surface at 304. As previously described, in the example of FIGS. 5 and 6 the movement of the stylus 50 along surface in first axial direction 105 causes a magnetic attraction between magnet 52 within stylus 50 and cam 130 of actuation assembly 120 such that actuation assembly 120 (particularly cam 130 and arms 122) are magnetically actuated via the movement of stylus 50. Method 300 also includes deploying a sleeve of the stylus holder away from the surface as a result of magnetically actuating the actuation assembly at 306, and inserting the stylus through the sleeve at 308. As described above for the example of FIGS. 5 and 6, the actuation of cam 130 and arms 122 of actuation assembly 120 as stylus 50 is moved in the first axial direction 105 causes the sleeve 110 to deploy from the withdrawn position (FIG. 5) to an extended position in which sleeve 110 is projected outward from aperture 22 so that stylus 50 may be inserted therethrough (FIG. 6).

Examples disclosed herein have included stylus holders for an electronic device (e.g., stylus holder 100 for electronic devices 10, 200) that are to provide a storage location for a stylus. In addition, the example stylus holders disclosed herein may be deployable from an external surface of the electronic device such that the stylus holders may be partially or wholly retracted into the external surface of the electronic device when a stylus is not stored therein. Thus, when a stylus is not inserted therein, the example stylus holders may be retracted and therefore hidden so as not to interfere with the operations or aesthetics of the electronic device.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. A method, comprising:
moving a stylus along a surface of an electronic device;
magnetically actuating an actuation assembly of a stylus holder of the electronic device as a result of moving the stylus along the surface; and
deploying a sleeve of the stylus holder away from the surface as a result of magnetically actuating the actuation assembly; and
inserting the stylus through the sleeve.

2. The method of claim 1, wherein magnetically actuating the actuation assembly comprises:
rotating an arm that is coupled to the sleeve.

3. The method of claim 2, wherein the arm is disposed under the surface of the electronic device.

4. The method of claim 2, wherein magnetically actuating the actuation assembly comprises:
magnetically attracting a cam to the stylus;
moving the cam with the stylus as a result of the magnetic attraction; and
engaging the arm with the cam.

5. The method of claim 4, wherein moving the stylus along the surface of the electronic device comprises moving the stylus along the surface in a first direction; and wherein the method comprises:
withdrawing the stylus from the sleeve;
moving the stylus along the surface in a second direction that is opposite the first direction;
moving the cam with the stylus in the second direction as a result of the magnetic attraction; and
retracting the sleeve toward the surface as a result of moving the cam.

6. An electronic device, comprising:
a housing including an external surface and an aperture extending through the external surface; and
a stylus holder comprising:
a sleeve to receive a stylus therethrough,
an actuation assembly coupled to the sleeve, wherein the actuation assembly comprises a cam that is magnetically actuated by the stylus to extend the sleeve through the aperture in the external surface.

7. The electronic device of claim 6, wherein the actuation assembly comprises an arm that is coupled to the sleeve, wherein the arm is to rotate about an axis of rotation when engaged by the cam to extend the sleeve from the aperture.

8. The electronic device of claim 7, wherein the arm is rotationally biased about the axis of rotation so as to bias the sleeve toward a retracted position within the aperture.

9. The electronic device of claim 8, wherein the electronic device comprises a display, wherein the external surface is disposed on a side of the electronic device that is opposite the display.

10. The electronic device of claim 7, wherein the cam is an elongate member comprising a central axis, a first end, a second end opposite the first end, and an angled edge that is disposed at an angle θ relative to the central axis that is greater than 0° and less than 90°.

11. The electronic device of claim 10, wherein the angled edge is to slidingly engage with the arm to rotate the arm about the axis of rotation.

12. A stylus holder for an electronic device, the stylus holder comprising:
  a sleeve that is to receive a stylus therethrough; and
  an actuation assembly coupled to the sleeve, wherein the actuation assembly comprises a cam that is magnetically actuated by movement of the stylus along an external surface of the electronic device to deform the sleeve into a curved arch that extends through an aperture in the external surface.

13. The stylus holder of claim 12, wherein the actuation assembly comprises plurality of arms that are coupled to the sleeve, wherein each arm of the plurality of arms is to rotate about a corresponding axis of rotation when engaged by the cam to deform the sleeve into the curved arch.

14. The stylus holder of claim 13, wherein each arm of the plurality of arms is rotationally biased about the corresponding axis of rotation so as to bias the sleeve toward a retracted position within the aperture.

15. The stylus holder of claim 14, wherein the cam is an elongate member comprising a central axis, a first end, a second end opposite the first end, and an plurality of angled edges that are disposed at an angle θ relative to the central axis that is greater than 0° and less than 90°, and wherein the plurality of angled edges are to slidingly engage with the plurality of arms to rotate each arm of the plurality of arms about the corresponding axis of rotation.

* * * * *